United States Patent
Shah

[11] Patent Number: 5,314,749
[45] Date of Patent: May 24, 1994

[54] HIGH DENSITY POLYETHYLENE SHRINK FILM

[75] Inventor: Gautam P. Shah, Simpsonville, S.C.

[73] Assignee: W.R. Grace & Co.-Conn., Duncan, S.C.

[21] Appl. No.: 34,006

[22] Filed: Mar. 19, 1993

Related U.S. Application Data

[63] Continuation of Ser. No. 529,068, May 25, 1990, abandoned.

[51] Int. Cl.$^5$ .................. B32B 7/12; B32B 27/68; B65D 33/00
[52] U.S. Cl. .................. 428/349; 428/516; 428/520; 428/910; 206/497
[58] Field of Search .............. 428/516, 520, 910, 349

[56] References Cited

U.S. PATENT DOCUMENTS

| | | | |
|---|---|---|---|
| 3,817,821 | 6/1974 | Gallini | 161/165 |
| 4,188,443 | 2/1980 | Mueller et al. | 428/216 |
| 4,258,166 | 3/1981 | Canterino et al. | 526/348 |
| 4,355,076 | 10/1982 | Gash | 428/411 |
| 4,380,567 | 4/1983 | Shigemoto | 428/213 |
| 4,447,480 | 5/1984 | Lustig et al. | 428/35 |
| 4,495,249 | 1/1985 | Ohy et al. | 428/516 |
| 4,551,380 | 11/1985 | Schoenberg | 428/518 |
| 4,724,185 | 2/1988 | Shah | 428/339 |
| 4,828,928 | 5/1989 | Shah | 428/518 |
| 4,978,572 | 12/1990 | Akao | 428/323 |
| 5,185,203 | 2/1993 | Itaba et al. | 428/349 |

OTHER PUBLICATIONS

US New Biax Film Technology, Technology News.

*Primary Examiner*—P. C. Sluby
*Attorney, Agent, or Firm*—Mark B. Quatt

[57] ABSTRACT

A multiple layer shrink film with improved moisture barrier properties is oriented in the longitudinal and/or transverse directions, and comprises an internal layer comprising high density polyethylene, and outer layers each comprising olefinic polymer or copolymer. Intermediate polymeric adhesive layers can optionally be included in those coextruded embodiments which do not melt bond adequately in the absence of such intermediate layers.

5 Claims, 1 Drawing Sheet

HIGH DENSITY POLYETHYLENE SHRINK FILM

This application is a continuation of application Ser. No. 529,068 filed on May 25, 1990, now abandoned.

BACKGROUND OF THE INVENTION

The present invention relates generally to shrink films, and more particularly to shrink films having an internal layer of high density polyethylene.

Various films and laminates are available for shrink packaging applications. These films and laminates (hereinafter collectively "films") ideally possess several properties which make them useful in packaging food and non-food items.

One particular property that is often desirable in shrink films is low moisture permeability. The inventor has found that a film with good shrink properties, heat sealability, and low moisture permeability includes an internal layer of high density polyethylene, and outer layers of ethylene polymers or copolymers.

Of interest is U.S. Pat. No. 4,355,076 issued to Gash wherein a monoaxially oriented polypropylene film may be laminated to a monoaxially oriented high density polyethylene film, said films produced by e.g. tubular blowing.

Also of interest is U.S. Pat. No. 4,188,443 issued to Mueller et al disclosing a five-layer film having two inner layers comprising ethylene vinyl acetate copolymer, and skin or outer layers comprising an ethylene propylene copolymer.

U.S. Pat. No. 4,258,156 (Canterino et al) discloses a uniaxially oriented plastic film made of low density polyethylene, or copolymers of ethylene with other unsaturated monomers, such as vinyl acetates, or olefinic monomers made by low pressure polymerization techniques.

U.S. Pat. No. 3,817,821 (Gallini) discloses a film with a core layer of HDPE, and surface layers of polyethylene and EVA.

U.S. Pat. No. 4,380,567 (Shigemoto) discloses a film with a layer of high density polyethylene and layers of an ethylene alpha olefin copolymer.

U.S. Pat. No. 4,724,185 (Shah) discloses an oriented film with outer layers of a blend of linear low density polyethylene, linear medium density polyethylene, and ethylene vinyl acetate copolymer.

U.S. Pat. No. 4,82B,928 (Shah) discloses a monoaxial shrink film with a core layer of high density polyethylene, outer layers of ethylene propylene copolymer and/or polypropylene, and intermediate bonding layers.

An article, *New Biax Film Technology*, appearing in Plastics Technology, June 1989, page 45, discusses a biax HDPE film with a surface crosslinked with electron radiation, and better moisture barrier than OPP.

It is an object of the present invention to provide a thermoplastic film with good shrink properties and low moisture permeability.

SUMMARY OF THE INVENTION

In one aspect of the present invention, a multilayer shrink film comprises an internal layer comprising a high density polyethylene; and two outer layers each comprising olefinic polymer or copolymer.

In another aspect of the present invention, a method for making a multilayer shrink film comprises coextruding a first melt stream of a high density polyethylene, two melt streams of an olefinic polymer or copolymer, and two melt streams of a polymeric adhesive; passing the coextruded melt streams through a coextrusion die Lo form a tubular film; rapidly cooling the tubular film; collapsing the cooled film; reheating the collapsed film to its orientation temperature; and stretching the reheated film in both the longitudinal and transverse directions.

DEFINITIONS

"Ethylene propylene copolymer" as used herein refers to a copolymer of ethylene and propylene having relatively small amounts, preferably between about 2% and 10% by weight, of the ethylene comonomer.

"Olefinic polymer" and "olefinic copolymer" as used herein refer to polymers, copolymers, terpolymers, etc. of an olefin, especially ethylene, and unsaturated esters such as vinyl acetate and alkyl acrylate, and also refers to copolymers, terpolymers, etc. of ethylene and olefins such as ethylene alpha-olefin copolymer (e.g. linear low density polyethylene and very low density polyethylene), linear medium density polyethylene, polypropylene, and ethylene propylene copolymer, and also refers to chemically modified derivatives of these materials.

"Linear medium density polyethylene" (LMDPE) as used herein means a copolymer of ethylene with one or more comonomers selected from preferably $C_4$ to $C_{10}$ alpha olefins such al butene-1, octene, etc. in which the molecules of the copolymers comprise long chains with few side chain branches or cross linked structures. This molecular structure is to be contrasted with conventional low or medium density polyethylenes which are more highly branched than their respective linear counterparts. This material can also be characterized by the low pressure, low temperature processes used to produce these materials. LMDPE has a density in the range of about 0.926 to 0.941 grams per cubic centimeter.

"Linear low density polyethylene" (LLDPE) as used herein means a copolymer as described above for LLDPE but having a density in the range of about 0.915 to about 0.926 grams per cubic centimeter.

"Very low density polyethylene" (VLDPE) as used herein means a copolymer as described above for LLDPE but having a density in the range of about 0.860 to about 0.915 grams per cubic centimeter.

BRIEF DESCRIPTION OF THE DRAWINGS

Further details are given below with reference to the drawings wherein.

DESCRIPTION OF THE PREFERRED EMBODIMENTS

Figure 1:
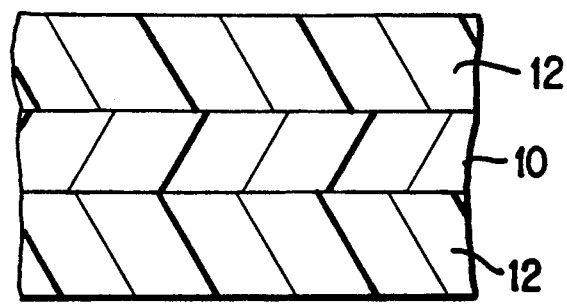
FIG. 1 is a schematic cross-section of one embodiment of a multilayer film of the invention.

Referring specifically to the drawings, in FIG. 1 a schematic cross-section of one embodiment of the multiply film of the invention is shown.

The film structure is a composite with an internal layer 10 comprising a high density polyethylene. A preferred, commercially available high density polyethylene is Dow Chemical's XU 61513.02, having a density of about 0.96 gms/cc.

Outer layers 12 can be an olefinic polymer, olefinic copolymer, or blends thereof. Examples of such materials include ethylene vinyl acetate copolymer, ethylene alkyl acrylate copolymer, ethylene alpha olefin copolymer, linear medium density polyethylene, linear low density polyethylene, very low density polyethylene, and ethylene propylene copolymer.

Outer layers 12 are preferably either an ethylene propylene copolymer, a polypropylene, or blends of these two materials. In blends, increasing the percentage of polypropylene imparts added stiffness, i.e. a higher modulus to the multilayer film. In a preferred embodiment, the blend comprises between about 5% and 95% ethylene propylene copolymer (EPC) and between about 95% and 5% polypropylene (PP).

For a stiffer film, i.e. a film with higher modulus, a more preferred blend comprises about 60% EPC and about 40% PP.

For a more flexible film, i.e. a film with lower modulus, a more preferred blend comprises about 92% EPC and about 8% PP. EPC contributes to the shrink characteristics of the film, so that the more flexible film will also exhibit better shrink characteristics such as higher free shrink at a given temperature, e.g. 200° F., than the stiffer film.

The outer layers 12 of the three-layer embodiment of the present film together constitute between about 10% and 95% of the total film thickness, preferably between about 20% and 80%, even more preferably between about 30% and 70% of the total film thickness, and most preferably about 40% of the total film thickness.

The interior layer 10 comprises between about 5% and 90% of the total film thickness, more preferably between about 20% and 80%, even more preferably between about 30% and 70% of the total film thickness; and most preferably about 60% of the total film thickness.

An alternative preferred outer layer 12 comprises a three component blend of linear low density polyethylene (LLDPE), linear medium density polyethylene (LMDPE), and ethylene vinyl acetate copolymer (EVA). These outer layers preferably include from about 40% to about 60% by weight of LLDPE, from about 20% to about 30% by weight of LMDPE, and from about 20% to about 30% by weight of EVA. More preferably, the outer layers 12 include about 50%, by weight, of LLDPE, about 25%, by weight, of LMDPE, and about 25%, by weight, of EVA.

The EVA has a vinyl acetate (VA) content of preferably between about 3.5% and 9% by weight, and more preferably between about 3.5% and 5% by weight.

Films of the present invention with the EPC or PP outer layers are preferably not irradiated. Films with the LLDPE outer layers are preferably irradiated, more preferably with between about 3 and 13 megarads (M.R.) of irradiation.

Figure 2:
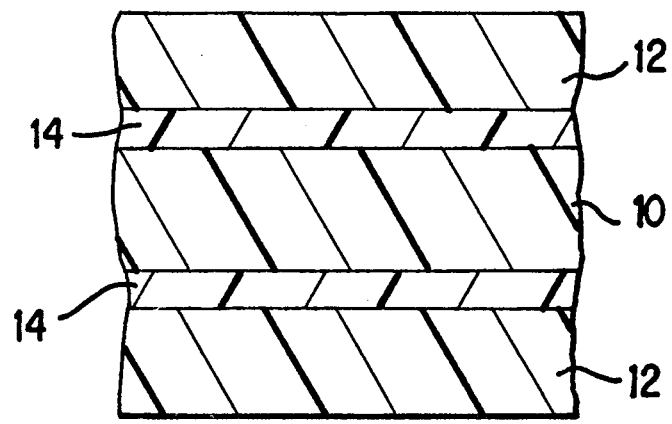
FIG. 2 is a schematic cross-section of an alternative embodiment of a film of the invention.

In coextruded embodiments of the multilayer film, the outer layers are sometimes bonded to the core layer by intermediate layers 14 (see FIG. 2) each comprising a suitable polymeric adhesive such as a copolymer of ethylene and vinyl acetate (EVA), the copolymer having preferably between about 4% and 30% vinyl acetate by weight of the copolymer.

For stiffer films, the EVA preferably has about 9% vinyl acetate.

For a more flexible film, a vinyl acetate percentage of about 20% is preferred.

Other preferred materials for layers 14 include ethylene alkyl acrylate, especially ethylene butyl acrylate copolymer; linear medium density polyethylene; linear low density polyethylene; very low density polyethylene; ethylene propylene copolymer; and chemical modified polymeric adhesives such as those having carboxylic acid or acid anhydride moieties, typically in a graft copolymer structure.

The intermediate layers 14 of the film together constitute preferably between about 5% and 50% of the total film thickness of the five-layer embodiment, more preferably between about 10% and 30%, and most preferably about 20% of the total film thickness. Layers 12 of the five-layer embodiment together comprise preferably between about 10% and 90% of the total film thickness, more preferably between about 40% and 80%, and most preferably about 60% of the total film thickness. Layer 10 preferably comprises between about 5% and 80%, more preferably between about 30% and 70%, and most preferably about 50% of the total film thickness.

The need for layers 14 depends to a large extent on the nature of the materials selected for outer layers 12, and the manner in which the various layers are bonded together. Most ethylene polymers and copolymers can be bonded directly to the HDPE internal layer by conventional lamination adhesives well known in the art. When coextrusion or extrusion coating techniques are used, it is difficult to adequately melt bond certain materials such as EPC or PP directly to HDPE. In such cases, one or more intermediate layers 14 are preferably used to provide interlayer adhesion.

The high density polyethylene of the core layer has a density of preferably between 0.94 and 0.97 grams per cubic centimeter, and more preferably a density of about 0.96 grams per cubic centimeter.

As indicated earlier with respect to the outer and intermediate layers, multilayer films having different modulus values can be produced by varying the composition or thickness of the core layer.

The film of the present invention is preferably made by coextrusion techniques in which melt streams of the various resins are extruded from respective extruders and passed through a die to form a tubular tape.

This tape has a thickness of preferably between about 6 and 16 mils.

The relatively thick coextruded tape is quenched for example in water, and then optionally irradiated with between about 1 and 5 megarads, and more preferably about 3 megarads of irradiation.

Irradiation can be accomplished by the use of high energy electrons, ultraviolet radiation, X-rays, gamma rays, beta particles, etc. Preferably, electrons are employed up to about 20 megarads (MR) dosage level. The irradiation source can be any electron beam generator operating in a range of about 150 kilovolts to about 6 megavolts with a power output capable of supplying the desired dosage. The voltage can be adjusted to appropriate levels e.g. 1,000,000, 6,000,000, etc. Many apparatus for irradiating films are known to those of skill in the art. The irradiation is usually carried out at a dosage up to about 20 MR, typically between about 1 MR and about 20 MR, with a preferred dosage range of about 2 MR to about 12 MR. Irradiation can be carried out at room temperature, although higher and lower temperatures, e.g. 0° C. to 60° C., can be used.

The coextruded tape is then reheated to its orientation temperature and inflated by the blown bubble technique well known in the art. Stretch ratios can range from about 2:1 in the longitudinal (machine) and transverse directions. More preferable orientation ranges are 4.0:1 in both directions.

The film is preferably biaxially oriented, i.e. is oriented to substantially the same extent in both the longitudinal and transverse directions. However, the term "biaxial" is also used herein to include some differences in the extent of orientation in each direction. The film can also be monoaxially oriented, i.e. oriented in essentially one direction only, although this term is also used herein to include some incidental orientation in the other direction as well.

Typical film thicknesses may range from for example 0.5 to 4 mils. A preferred film thickness is about 2 mils. Increasing film thicknesses will provide more stiffness to the film in cases where a higher modulus is desired because of limitations of label-making equipment.

The invention may be further understood by reference to the following examples.

EXAMPLE 1

A core layer of high density polyethylene (Dow XU 61513.02) having a density of 0.962 grams per cubic centimeter was extruded from a first extruder in a coextrusion arrangement. Intermediate layers of an LLDPE-based polymeric adhesive (du Pont Bynel CXA 4104) were extruded as a split stream from a second extruder. Outer layers of a blend of 50% by weight LLDPE (Dowlex 2045), 25% LMDPE (Dowlex 2037) and 15% EVA having a vinyl acetate content of about 3.6%, blended with about 10% of a masterbatch concentrate containing slip and antiblack additives compounded with EVA af about 3.5% vinyl acetate content by weight, were extruded from third and fourth extruders respectively. The various melt streams were cast extruded as a tubular tape from a coextrusion die. The core layer comprised about 20% of the total thickness of the tape and resulting film. The outer layers each comprised about 30% of total film thickness, and intermediate layers each comprised about 10% of total film thickness. were extruded from third and fourth extruders respectively. each comprised about 25% of total film thickness, and intermediate layers each comprised about 10% of total film thickness.

After rapid water quenching of the extruded tape, the tape was irradiated at a dosage of 8 megarads. The irradiated tape was then reheated to its orientation temperature of about 250° F. to 265° F., and biaxially stretched in a blown bubble to a stretch ratio of about 4:1 in both the longitudinal and machine directions.

EXAMPLE 2

Another film was produced by the same process as described in Example 1, except that the film of Example 2 was not irradiated. The film had a core layer of high density polyethylene (Dow XU 61513.02) having a density of 0.96 grams per cubic centimeter; outer layers of a blend of 92% EPC (Fina 8473) and 8% polypropylene (Himont PD064), the PP included as a masterbatch with slip and antiblock additives; and intermediate layers of an EVA (Exxon LD 318.92).

EXAMPLE 3

Another film was produced by the same process as described in Example 1, except that the film of Example 3 was not irradiated. The film had a core layer of high density polyethylene (Dow XU 61513.02) having a density of 0.96 grams per cubic centimeter; outer layers of a blend of 92% EPC (Fina 8473) and 8% polypropylene (Himont PD064), the PP included as a masterbatch with slip and antiblock additives; and intermediate layers of an EVA-based polymeric adhesive (du Pont Bynel 3062).

EXAMPLE 4

Another film was produced by the same process as described in Example 1, and with the same composition as the film of Example 1, except that no intermediate layers were present, so that the final film had three layers. The outer layers each comprises about 35% of the total thickness of the film; the interior layer comprised about 20% of the total film thickness.

All four examples produced films suitable for use in shrink packaging applications, especially those requiring good moisture barrier properties.

Suitable modifications may be made in the film, such as the introduction of desirable pigments to one or more of the resins used to prepared the multilayer film.

Although cross-linking of the film is preferably accomplished by irradiation, as described above, other methods of cross-linking, such as chemical cross-linking, can also be used in connection with the present invention.

Although the present invention has been described in connection with preferred embodiments, it should be understood that modifications may be made without departing from the principles and scope of the invention, as those skilled in the art will readily understand. For example, although the outer layers of the present film are preferably the same material or material blend, different resins or combinations of resins can be employed for the outer layers. Accordingly, such modifications and variations may be practiced within the scope of the following claims.

What is claimed is:

1. A biaxially oriented multilayer shrink film comprising:
   (a) an internal layer consisting essentially of a high density polyethylene; and
   (b) two outer layers each comprising olefinic polymer or copolymer;
   wherein the two outer layers each comprise an olefinic polymer or copolymer selected from the group consisting of ethylene vinyl acetate copolymer, ethylene alkyl acrylate copolymer, linear medium density polyethylene, linear low density polyethylene, and very low density polyethylene.

2. The film of claim 1 wherein the two outer layers each have substantially the same composition.

3. The film according to claim 1 wherein the outer layers each comprise a blend of linear low density polyethylene, linear medium density polyethylene, and ethylene vinyl acetate copolymer.

4. The film of claim 1 further comprising two intermediate layer search bonding the core layer to a respective outer layer, and comprising an olefinic polymeric adhesive or ethylene copolymer.

5. The film according to claim 4 wherein the intermediate layers each comprise an ethylene copolymer selected from the group consisting of ethylene vinyl acetate copolymer, ethylene alkyl acrylate copolymer, linear medium density polyethylene, linear low density polyethylene, very low density polyethylene, linear low density-based polymeric adhesive, and ethylene vinyl acetate copolymer-based polymeric adhesive.

* * * * *

UNITED STATES PATENT AND TRADEMARK OFFICE
CERTIFICATE OF CORRECTION

PATENT NO. : 5,314,749

DATED : May 24, 1994

INVENTOR(S) : GAUTAM P. SHAH

It is certified that error appears in the above-identified patent and that said Letters Patent is hereby corrected as shown below:

Column 6, claim 4, line 55, change "layer search" to --layers each--.

Signed and Sealed this

Thirtieth Day of August, 1994

Attest:

BRUCE LEHMAN

Attesting Officer

Commissioner of Patents and Trademarks